United States Patent
Benson et al.

(10) Patent No.: US 8,524,370 B2
(45) Date of Patent: *Sep. 3, 2013

(54) MULTILAYER FILMS INCLUDING THERMOPLASTIC SILICONE BLOCK COPOLYMERS

(75) Inventors: Karl E. Benson, St. Paul, MN (US); Richard G. Hansen, Mahtomedi, MN (US); Stephen A. Johnson, Woodbury, MN (US); Charles M. Leir, Falcon Heights, MN (US); Richard Y. Liu, Woodbury, MN (US); Mark D. Purgett, Oakdale, MN (US); Hildegard M. Schneider, Woodbury, MN (US); Audrey A. Sherman, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/779,742

(22) Filed: May 13, 2010

(65) Prior Publication Data
US 2010/0221511 A1    Sep. 2, 2010

Related U.S. Application Data

(62) Division of application No. 11/614,169, filed on Dec. 21, 2006, now Pat. No. 7,820,297.

(60) Provisional application No. 60/753,791, filed on Dec. 23, 2005.

(51) Int. Cl.
*H01B 1/12* (2006.01)
*B32B 7/02* (2006.01)

(52) U.S. Cl.
USPC ............ 428/447; 428/212; 428/448; 528/38; 528/26

(58) Field of Classification Search
USPC ......... 252/197.4, 299.01; 359/584; 428/426, 428/457, 480, 500, 447.448; 528/25–28, 528/353
See application file for complete search history.

(56) References Cited

U.S. PATENT DOCUMENTS 3,247,392 A    4/1966 Thelen
3,890,269 A    6/1975 Martin
(Continued)

FOREIGN PATENT DOCUMENTS

JP    03-231812    10/1991
JP    05-229271    9/1993
(Continued)

OTHER PUBLICATIONS

McGrath et al., "Synthesis and Characterization of Semented Siloxane Copolymers", Polymer Preprints, vol. 39, No. 1, 1998, pp. 455-456.
(Continued)

*Primary Examiner* — James J Seidleck
*Assistant Examiner* — S. Camilla Pourbohloul
(74) *Attorney, Agent, or Firm* — Kristofor L. Storvick

(57) ABSTRACT

A multilayer film includes a first layer of a first polymeric material and a second layer of a second polymeric material. The first material has a first index of refraction and the second material has a second index of refraction less than the first index of refraction. In one embodiment, the second material includes a polydiorganosiloxane polyamide block copolymer. In another embodiment, the second material includes a polydiorganosiloxane polyoxamide block copolymer.

6 Claims, 9 Drawing Sheets

(56) References Cited

U.S. PATENT DOCUMENTS

| | | |
|---|---|---|
| 4,119,615 A | 10/1978 | Schulze |
| 4,249,011 A | 2/1981 | Wendling |
| 4,374,237 A | 2/1983 | Berger et al. |
| 4,661,577 A | 4/1987 | Jo Lane et al. |
| 5,026,890 A | 6/1991 | Webb et al. |
| 5,214,119 A | 5/1993 | Leir et al. |
| 5,276,122 A | 1/1994 | Aoki et al. |
| 5,290,615 A | 3/1994 | Tushaus et al. |
| 5,360,659 A | 11/1994 | Arends et al. |
| 5,437,813 A * | 8/1995 | Akashi et al. .............. 428/1.25 |
| 5,461,134 A | 10/1995 | Leir et al. |
| 5,512,650 A | 4/1996 | Leir et al. |
| 5,663,262 A | 9/1997 | Shirakawa et al. |
| 5,814,711 A | 9/1998 | Choe et al. |
| 5,825,542 A | 10/1998 | Cobb, Jr. et al. |
| 5,825,543 A | 10/1998 | Ouderkirk et al. |
| 5,828,488 A | 10/1998 | Ouderkirk et al. |
| 5,837,804 A | 11/1998 | Yamagishi et al. |
| 5,867,316 A | 2/1999 | Carlson et al. |
| 5,882,774 A | 3/1999 | Jonza et al. |
| 5,981,680 A | 11/1999 | Petroff et al. |
| 6,025,897 A | 2/2000 | Weber et al. |
| 6,045,894 A | 4/2000 | Jonza et al. |
| 6,051,216 A | 4/2000 | Barr et al. |
| 6,096,375 A | 8/2000 | Ouderkirk et al. |
| 6,101,032 A | 8/2000 | Wortman et al. |
| 6,340,404 B1 | 1/2002 | Oka et al. |
| 6,352,761 B1 | 3/2002 | Hebrink et al. |
| 6,355,759 B1 | 3/2002 | Sherman et al. |
| 6,368,699 B1 | 4/2002 | Gilbert et al. |
| 6,407,195 B2 | 6/2002 | Sherman et al. |
| 6,441,118 B2 | 8/2002 | Sherman et al. |
| 6,449,093 B2 | 9/2002 | Hebrink et al. |
| 6,459,514 B2 | 10/2002 | Gilbert et al. |
| 6,531,230 B1 | 3/2003 | Weber et al. |
| 6,531,620 B2 | 3/2003 | Brader et al. |
| 6,602,609 B1 | 8/2003 | Kong |
| 6,664,359 B1 | 12/2003 | Kangas et al. |
| 6,730,397 B2 | 5/2004 | Melancon et al. |
| 6,783,349 B2 | 8/2004 | Neavin et al. |
| 6,827,886 B2 | 12/2004 | Neavin et al. |
| 6,846,893 B1 | 1/2005 | Sherman et al. |
| 7,019,304 B2 | 3/2006 | Albagli et al. |
| 7,052,762 B2 | 5/2006 | Hebrink et al. |
| 7,501,184 B2 | 3/2009 | Leir et al. |
| 2003/0165676 A1 | 9/2003 | Zhou et al. |
| 2003/0175510 A1 | 9/2003 | Sherman et al. |
| 2003/0194537 A1 | 10/2003 | Bhagwagar |
| 2003/0235553 A1 | 12/2003 | Lu et al. |
| 2004/0115153 A1 | 6/2004 | Yu |
| 2004/0120912 A1 | 6/2004 | Yu |
| 2005/0003208 A1 * | 1/2005 | Graf et al. ............... 428/426 |
| 2005/0009985 A1 | 1/2005 | Selbertinger et al. |
| 2007/0177272 A1 | 8/2007 | Benson et al. |
| 2007/0177273 A1 | 8/2007 | Benson et al. |

FOREIGN PATENT DOCUMENTS

| | | |
|---|---|---|
| JP | 5-229271 | 9/1993 |
| JP | 08-269340 | 10/1996 |
| JP | 2006-225577 | 8/2006 |
| WO | WO 2004/054523 | 7/2004 |

OTHER PUBLICATIONS

U.S. Appl. No. 60/753,857, titled "Films Including Thermoplastic Silicone Block Copolymers", filed Dec. 23, 2005.

U.S. Appl. No. 60/753,791, titled "Multilayer Films Including Thermoplastic Silicone Block Copolymers", filed Dec. 23, 2005.

* cited by examiner

MULTILAYER FILMS INCLUDING THERMOPLASTIC SILICONE BLOCK COPOLYMERS

CROSS REFERENCE TO RELATED APPLICATIONS

This application is a divisional of U.S. application Ser. No. 11/614,169, filed on Dec. 21, 2006, now U.S. Pat. No. 7,820, 297, which claims the benefit of U.S. Provisional Application Ser. No. 60/753,791, filed Dec. 23, 2005, which is incorporated herein by reference.

BACKGROUND OF THE INVENTION

Multilayer polymeric optical films are widely used for various purposes, including as mirrors and polarizers. These films often have extremely high reflectivity, while being lightweight and resistant to breakage. Examples of a wide variety of multilayer films are included in the commonly assigned U.S. Pat. No. 5,882,774, entitled "Optical Film," which is hereby incorporated by reference. Exemplary applications include compact electronic displays, including liquid crystal displays (LCDs) placed in mobile telephones, personal data assistants, computers, televisions and other devices.

Known multilayer optical films have alternating layers of materials having differing indices of refraction. Polymethyl Methacrylate (PMMA) has been considered as the lower-index material in such films. PMMA is typically extruded at a temperature between 235 degrees C. and 250 degrees C. Thus, it is not ideally coextruded with high-index materials such as polyethylene terephthalate (PET), which is typically extruded at a minimum temperature of about 265 degrees C., or polyethylene naphthalate (PEN), which is typically extruded at a minimum temperature of about 270 degrees C.

Thus, there remains a need for a low-refractive-index material that is process compatible with high-refractive index polymers such as PET and PEN.

SUMMARY OF THE INVENTION

A multilayer film includes a first layer of a first polymeric material and a second layer of a second polymeric material. The first material has a first index of refraction and the second material has a second index of refraction less than the first index of refraction. In one embodiment, the second material includes a polydiorganosiloxane polyamide block copolymer. In another embodiment, the second material includes a polydiorganosiloxane polyoxamide block copolymer.

Figure 1:
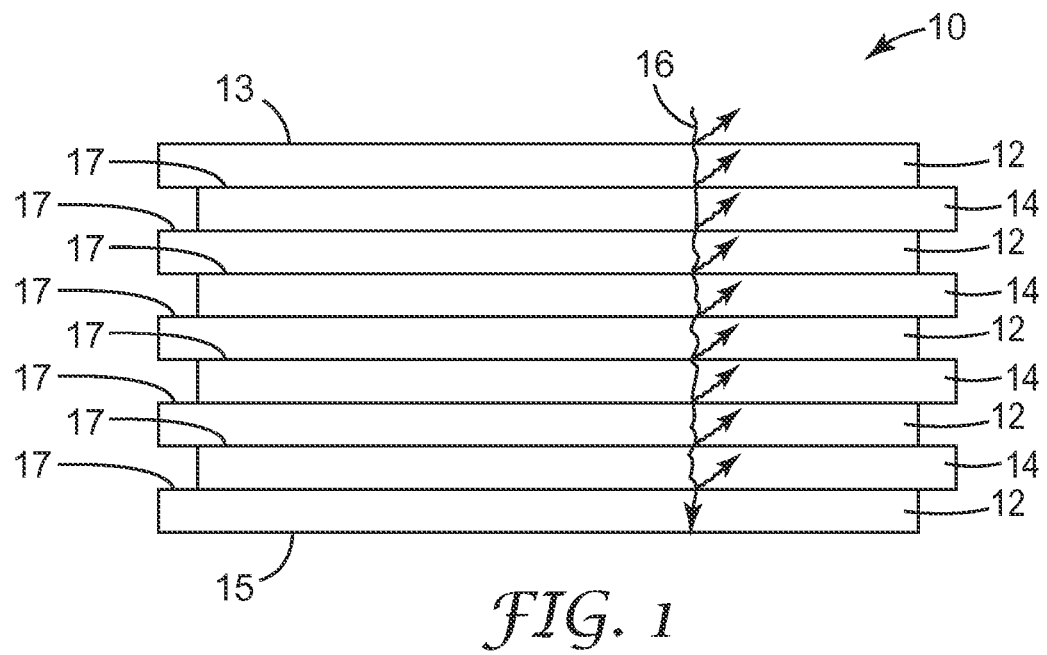
FIG. 1 shows one exemplary embodiment of a multilayer optical film of the present disclosure.

While the above-identified drawing figures set forth several exemplary embodiments of the disclosure, other embodiments are also contemplated. This disclosure presents illustrative embodiments of the present invention by way of representation and not limitation. Numerous other modifications and embodiments can be devised by those skilled in the art which fall within the scope and spirit of the principles of the present disclosure. The drawing figures are not drawn to scale.

Moreover, while embodiments and components are referred to by the designations "first," "second," "third," etc., it is to be understood that these descriptions are bestowed for convenience of reference and do not imply an order of preference. The designations are presented merely to distinguish between different embodiments for purposes of clarity.

Unless otherwise indicated, all numbers expressing feature sizes, amounts, and physical properties used in the specification and claims are to be understood as being modified in all instances by the term "about." Accordingly, unless indicated to the contrary, the numbers set forth are approximations that can vary depending upon the desired properties using the teachings disclosed herein.

DETAILED DESCRIPTION

Typical exemplary embodiments of the present disclosure include a film having two or more layers. A particularly suitable application of the multilayer film of the present disclosure is as an optical film. Multilayer optical films are useful, for example, as highly efficient mirrors and/or polarizers. Multilayer optical films as used in conjunction with the present disclosure exhibit relatively low absorption of incident light, as well as high reflectivity for off-axis as well as normal light rays. These properties generally hold whether the films are used for pure reflection or reflective polarization of light. The unique properties and advantages of the multilayer optical film provide an opportunity to design highly efficient optical systems, such as backlight systems, which exhibit low absorption losses when compared to other optical systems. Some suitable applications are described in U.S. Pat.

No. 6,531,230, entitled "Color shifting film," and U.S. Pat. No. 6,045,894, entitled "Clear to colored security film," which are hereby incorporated by reference.

Multilayer films of the present disclosure possess unexpectedly high delamination resistance. Moreover, in some exemplary embodiments, they exhibit advantages of higher optical power, thinner construction, less color absorption or loss due to the reduced material volume in the thin film construction, and less UV-absorption compared to other films.

As used in this application:

"birefringent" means that the indices of refraction in orthogonal x, y, and z directions are not all the same. For the polymer layers described herein, the axes are selected so that x and y axes are in the plane of the layer and the z axis is normal to the plane of the layer and typically corresponds to the thickness or height of the layer. Where a refractive index in one in-plane direction is larger than a refractive index in another in-plane direction, the x-axis is generally chosen to be the in-plane direction with the largest index of refraction, which sometimes corresponds to one of the directions in which the optical film is oriented (e.g., stretched);

"dispersion" is the dependence of refractive index on wavelength;

"high refractive index" and "low refractive index" are relative terms; when two layers are compared in at least one direction of interest, the layer that has a greater in-plane refractive index is the high refractive index layer, and the layer that has a lower in-plane refractive index is the low refractive index layer;

"index of refraction" refers to a refractive index of a material in the plane of the material with respect to light at 633 nm and normal incidence, unless otherwise indicated;

"polymer" means, unless otherwise indicated, polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included, unless indicated otherwise; and "Tg" means the temperature at which a polymer transitions from a glassy to a rubbery state, as measured by differential scanning calorimetry.

An exemplary multilayer film 10 of the present disclosure as illustrated in FIG. 1 includes a multilayer stack having alternating layers 12, 14 of at least two materials. In one embodiment, the materials of layers 12 and 14 are polymeric. Multilayer film 10 includes first major surface 13 and second major surface 15. In general, U.S. Pat. No. 6,827,886, entitled "Method for making multilayer optical films," hereby incorporated by reference, describes methods that can be adapted for making multilayer film 10. In addition, although film 10 and layers 12, 14 are illustrated as having planar surfaces, at least one surface of the film 10 or layers 12, 14 or an additional layer may be structured.

An in-plane index of refraction n1 of high refractive index layer 12 is higher than an in-plane index of refraction n2 of low refractive index layer 14. The difference in refractive index at each boundary between layers 12, 14 causes part of light ray 16 to be reflected. The transmission and reflection characteristics of multilayer film 10 is based on coherent interference of light caused by the refractive index difference between layers 12, 14 and the thicknesses of layers 12, 14. When the effective indices of refraction (or in-plane indices of refraction for normal incidence) differ between layers 12, 14, the interface between adjacent layers 12, 14 forms reflecting surface 17. The reflective power of interface surface 17 depends on the square of the difference between the effective indices of refraction of the layers 12, 14 (e.g., $(n1-n2)^2$. By increasing the difference in the indices of refraction between the layers 12, 14, improved optical power (higher reflectivity), thinner films (thinner or fewer layers), and broader bandwidth applications can be achieved. Multilayer film 10 can thus be made useful as a reflective polarizer or mirror, for example. The refractive index difference in an exemplary embodiment is at least about 0.05, preferably greater than about 0.10, more preferably greater than about 0.20 and even more preferably greater than about 0.30. In one example, the material for high refractive index layer 12 is a polyester with a refractive index of about 1.65. In one example, the material for low refractive index layer 14 is a polymer with a refractive index less than about 1.47, more preferably less than about 1.44, and even more preferably less than about 1.42.

In one embodiment, the materials of layers 12, 14 inherently have differing indices of refraction. In another embodiment, at least one of the materials of layers 12, 14 has the property of stress induced birefringence, such that the index of refraction (n) of the material is affected by the stretching process. By stretching multilayer film 10 over a range of uniaxial to biaxial orientations, films can be created with a range of reflectivities for differently oriented plane-polarized incident light. "Oriented direction" is the in-plane direction in which the film is stretched. "Transverse direction" is the direction in the plane of the film orthogonal to the direction in which the film is oriented.

In exemplary embodiments, multilayer film 10 includes tens, hundreds or thousands of layers, and each layer can be made from any of a number of different materials. The characteristics which determine the choice of materials for a particular stack depend upon the desired optical performance of multilayer film 10. Multilayer film 10 can contain as many materials as there are layers in the stack. However, for ease of illustration, exemplary embodiments of optical thin film stacks show only a few different materials.

In one embodiment, the number of layers in multilayer film 10 is selected to achieve the desired optical properties using the minimum number of layers for reasons of film thickness, flexibility and economy. In the case of reflective films such as polarizers and mirrors, the number of layers is preferably less than about 2,000, more preferably less than about 1,000, and even more preferably less than about 500.

TABLE 1 shows the construction of several examples of multilayer film 10 of the present disclosure. Each exemplary film of TABLE 1 consists of alternating layers of a high refractive index material and a low refractive index material. In each example, the low refractive index material is polydiorganosiloxane polyoxamide block copolymer.

TABLE 1

| High index Material | Theoretical Reflectivity | Number of layers | Film thickness (mil) | Film thickness (micrometer) |
| --- | --- | --- | --- | --- |
| PEN | 99.9% | 323 | 1.57 | 39.88 |
| PET | 99.9% | 663 | 3.11 | 78.99 |
| PEN | 99% | 203 | 1.06 | 26.92 |
| PET | 99% | 423 | 2.05 | 52.07 |

The boundaries between the different materials, or between chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

One embodiment of multilayer film 10 comprises multiple low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers 12, 14 in the multilayer stack having an average thickness of not more than about 0.5 micrometer. In other exemplary embodiments, different low-high index pairs of layers may have different combined optical thicknesses, such as where a broadband reflective optical film is desired.

In those applications where reflective films (e.g. mirrors or polarizers) are desired, the desired average transmission for light of each polarization and plane of incidence generally depends upon the intended use of the reflective film. One way to produce a multilayer mirror film is to biaxially stretch a multilayer stack. For a high efficiency reflective film, average transmission along each stretch direction at normal incidence over the visible spectrum (about 380-750 nm) is desirably less than about 10 percent (reflectance greater than about 90 percent), preferably less than about 5 percent (reflectance greater than about 95 percent), more preferably less than about 2 percent (reflectance greater than about 98 percent), and even more preferably less than about 1 percent (reflectance greater than about 99 percent). The average transmission at about 60 degrees from the normal over the visible spectrum is desirably less than about 20 percent (reflectance greater than about 80 percent), preferably less than about 10 percent (reflectance greater than about 90 percent), more preferably less than about 5 percent (reflectance greater than about 95 percent), and even more preferably less than about 2 percent (reflectance greater than about 98 percent), and even more preferably less than about 1 percent (reflectance greater than about 99 percent).

In addition, asymmetric reflective films (such as films resulting from unbalanced biaxial stretching) may be desirable for certain applications. In that case, average transmission along one stretch direction may be desirably less than, for example, about 50 percent, while the average transmission along the other stretch direction may be desirably less than, for example, about 20 percent, over a bandwidth of, for example, the visible spectrum (about 380-750 nm), or over the visible spectrum and into the near infrared (e.g., about 380-850 nm).

Multilayer optical films can also be designed to operate as reflective polarizers. One way to produce a multilayer reflective polarizer is to uniaxially stretch a multilayer stack. The resulting reflective polarizers have high reflectivity for light with its plane of polarization parallel to a first in-plane axis (usually, in the stretch direction) for a broad range of angles of incidence, and simultaneously have low reflectivity and high transmissivity for light with its plane of polarization parallel to a second in-plane axis that is orthogonal to the first in-plane axis (usually, in the non-stretch direction) for a broad range of angles of incidence. By controlling the three indices of refraction of each film, nx, ny and nz, the desired polarizer behavior can be obtained.

A wide variety of materials can be used to form multilayer mirror films or polarizers according to the present disclosure when processed under conditions selected to yield the desired refractive index relationships. The desired refractive index relationships can be achieved in a variety of ways, including stretching during or after film formation (for example, in the case of organic polymers), extruding (for example, in the case of liquid crystalline materials), or coating. In one embodiment, the materials of layers 12, 14 have compatible thermal processing ranges and similar rheological properties (for example, melt viscosities) such that they can be co-extruded.

Materials suitable for making optical films for use in exemplary embodiments of the present disclosure include polymers such as, for example, polyesters, copolyesters and modified copolyesters. Polyesters suitable for use in some exemplary optical films according to the present disclosure generally include carboxylate and glycol subunits and can be generated by reactions of carboxylate monomer molecules with glycol monomer molecules. Each carboxylate monomer molecule has two or more carboxylic acid or ester functional groups and each glycol monomer molecule has two or more hydroxy functional groups. The carboxylate monomer molecules may all be the same or there may be two or more different types of molecules. The same applies to the glycol monomer molecules. Also included within the term "polyester" are polycarbonates derived from the reaction of glycol monomer molecules with esters of carbonic acid. Because polymeric materials are typically dispersive, that is, their refractive indices vary with wavelength, their selection should be considered in terms of a particular spectral bandwidth of interest.

Some exemplary materials for high refractive index layer 12 are crystalline, semi-crystalline, amorphous or liquid crystalline materials, including polymers. Many high index birefringent polymers can be amorphous. Although crystallinity may aid in preserving the birefringence of oriented films, an oriented amorphous polymer film will remain birefringent if the glass transition temperature of the film is sufficiently higher than its maximum use temperature, for example. Specific examples of suitable materials for high refractive index layer 12 include polyalkylene naphthalates (e.g., PEN(polyethylene naphthalate), PPN(polypropylene naphthalate), PBN(polybutylene naphthalate), and PCN(poly-1,4-cyclohexanedimethylene naphthalate), PHN(polyhexamethylenenaphthalate)) and isomers thereof (e.g., 2,6-, 1,4-, 1,5-, 2,7-, and 2,3-PEN), polyalkylene terephthalates (e.g., PET (polyethylene terephthalate), PPT(polypropylene terephthalate), PBT(polybutylene terephthalate), and PCT(poly-1,4-cyclohexanedimethylene terephthalate), PHT (polyhexamethyleneterephthalate)), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), polysulfones, polyethersulfones, polyacrylonitrile, polyamides, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN, PBN, PPN, PCN, PHN, PET, PBT, PPT, PCT, PHT (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethanel diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a coPEN.

In one exemplary embodiment of the present disclosure, the low refractive index material for layer 14 is a thermoplastic polydiorganosiloxane polyamide block copolymer (where the polyamide component may be ethylene terephthalamide, hexamethylene adipamide, butylene sebacamide, or any other known polyamide). In one exemplary embodiment of the present disclosure, the low refractive index material for layer 14 is a polydiorganosiloxane polyoxamide block copolymer, further described in U.S. patent application Ser. No. 11/317, 271, filed on Dec. 23, 2005, incorporated herein by reference in its entirety. The polydiorganosiloxane polyoxamide block copolymers have a plurality of oxalylamino and aminoxalylamino groups (e.g., the oxalylamino groups can be part of the aminoxalylamino groups). The polydiorganosiloxane polyoxamide copolymers can contain a relatively large fraction of the polydiorganosiloxane segment compared to many known polydiorganosiloxane polyamide copolymers. The polydiorganosiloxane polyoxamide copolymer can usually be subjected to elevated temperatures up to 250° C. or higher without apparent degradation.

In one embodiment, a copolymeric material is provided that contains at least two repeat units of Formula I.

tures and can also be prepared with a wide range of viscosities. Exemplary polydiorganosiloxane polyoxamide block copolymers have a refractive index of about 1.41 at 633 nm, which is desirably low compared to the index of refraction of most polymeric materials. Additionally, polydiorganosiloxane polyamide block copolymers demonstrate high levels of adhesion to many coextruded polymers. Moreover, they are highly extensible or drawable in that they can be stretched to high levels without significant degradation of or change in their optical properties. For each application, a suitable polydiorganosiloxane polyamide block copolymer is selected to be paired with the selected high refractive index material, taking into account compatibility properties such as melt viscosity, thermal stability, and adhesion, especially during the length orientation and/or tentering operations required for processing. Polydiorganosiloxane polyamide block copolymers with hard segment contents from about 1 percent to about 10 percent are especially suitable because they are thermoplastic elastomers: solid under ambient conditions, yet able to soften or flow at elevated temperatures. Herein, the term "hard segment" refers to organic amide blocks and terminal groups. The polyamine residue is the polyamine minus the —NHR$^3$ groups. The polydiorganosiloxane residue is connected to the polyamine residue by amide linkages.

Desirable material properties of polydiorganosiloxane polyamide block copolymers for use in low refractive index layer 14 include, for example: (1) isotropic or negative birefringence, (2) thermal stability (stable to at least about 250 degrees C. for about 1 hour), (3) processing temperatures compatible with those of the material of high refractive index layer 12 (from about room temperature to about 300 degrees C., assuming the viscosity has been tailored appropriately), (4) UV stability or protectability, (5) high clarity (e.g., high transmission and low absorption over wavelengths of interest), (6) low Tg (in this case, −120 degrees C.), (7) viscosities that facilitate viscosity matching with the material of high refractive index layer 12, to ensure co-extrusion and flow stability, (8) good interlayer adhesion with high refractive

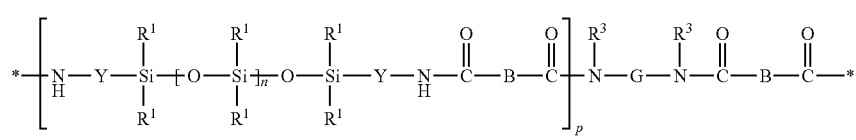

In this formula, each R$^1$ is independently an alkyl, haloalkyl, aralkyl, alkenyl, aryl, or aryl substituted with an alkyl, alkoxy, or halo. Each Y is independently an alkylene, aralkylene, or a combination thereof. Subscript n is independently an integer of 0 to 1500 and subscript p is an integer of 1 to 10. Group G is a divalent group that is the residue unit that is equal to a diamine of formula R$^3$HN-G-NHR$^3$ minus the two —NHR$^3$ groups (i.e., amino groups) where R$^3$ is hydrogen, alkyl, or forms a heterocyclic group when taken together with G and with the nitrogen to which it is attached. Each group B is independently a covalent bond, an alkylene of 4-20 carbons, an aralkylene, an arylene, or a combination thereof. When each group B is a covalent bond, the polydiorganosiloxane polyamide block copolymer of Formula I is referred to as a polydiorganosiloxane polyoxamide block copolymer. Each asterisk indicates the position of attachment of the repeating unit to another group such as another repeat unit.

Such polydiorganosiloxane polyamide block copolymers are thermally stable over a wide range of processing temperaindex layer 12, (9) low optical dispersion, (10) good z-index matching with high refractive index layer 12, (11) drawability (e.g., the ability to be oriented without birefringence), and (12) scratch and abrasion resistance.

Since polydiorganosiloxane polyamide block copolymers can be made with a range of refractive indices, it will be understood that a polydiorganosiloxane polyamide block copolymer having a relatively high refractive index, and meeting all other requirements set forth herein for a high refractive index layer polymer, could serve as the material of high refractive index layer 12.

Delamination of the interphase between polymer layers 12, 14 in multilayer films 10 is usually predictable using knowledge of polymer interactions. The polymer interaction can be calculated using polymer solubility parameters as disclosed in the literature. The method involves calculating the cohesive properties of a given pair of polymers which is called cohesive energy, E$_{co}$.

One can calculate the cohesive energy of a given polymer using its repeating unit via the group contribution method of Fedors.

$$E_{co} = \sum_i E_{o,i} \cdot n \left(\frac{J}{\text{mol}}\right) \text{ cohesive energy} \quad (1)$$

where $E_{o,i}$ and n are the molar cohesive energy and number for each functional group in the repeating unit of a polymer, respectively.

Coupling with the molar volume, V, as calculated by the same group contribution method shown as follows, $$V = \sum_i V_i \cdot n \left(\frac{\text{cm}^3}{\text{mol}}\right) \text{ molar volume} \quad (2)$$

where $V_i$ is the molar volume for individual functional group in the repeating unit.

One can calculate the solubility parameter, $\delta$, for the given polymers, $$\delta = \left(\frac{E_{co}}{V}\right)^{0.5} \left(\frac{J}{\text{cm}^3}\right)^{0.5} \text{ solubility parameter} \quad (3)$$

From the solubility parameters of two polymers, one can calculate the Flory-Huggins interaction parameter of these two polymers, $$\chi = \frac{V_{ref}}{RT}(\delta_1 - \delta_2)^2 \text{ interaction parameter} \quad (4)$$

where $V_{ref}$ is the reference volume; R is the gas constant; T is the temperature in K.

Ideally, a miscible polymer pair would have identical solubility parameters, resulting in a value for $\chi$ that is very close to zero. On the contrary, if two polymers have very different solubilities, the interaction parameter will be significantly larger than zero. By comparing the interaction parameters of different polymer pairs, one can generally predict the theoretical strength of polymer interactions.

From the theoretical calculation, multilayer films 10 having polydiorganosiloxane polyoxamide block copolymers in layer 14 paired with polyesters such as PET or PEN in layer 12 have higher interaction parameters (~2.2) than other polymer pairs. This indicates theoretically that multilayer films 10 will possess a thin interphase between the materials. Accordingly, one would expect that such multilayer films 10 would tend to exhibit weak interlayer adhesion and therefore be subject to delamination.

However, in practice, cast and oriented multilayer films 10 of the present disclosure have exhibited unexpectedly high interlayer adhesion values and delamination resistance that do not conform to the theoretical predictions. In one example, films of 3-layer construction were produced using a pilot scale coextrusion line. The extrusion temperatures depend on the viscosity of the materials. A processing temperature of about 530° F. (277° C.) was chosen for PET, PMMA and the polydiorganosiloxane polyoxamide block copolymer. Due to its higher melting point, PEN was extruded at 540° F. (282° C.). The die and feedblock were run at 530° F. (277° C.) for PET and 540° F. (282° C.) for PEN. The 6 inch (15.2 cm) wide extrudate was quenched on a chill roll and 30 mil (0.76 mm) cast web was collected. Delamination testing was carried out using a peel tester at 90 degree peel angle and 60 in/sec peel speed. In one sample, a cast three-layer film 10 having polydiorganosiloxane polyoxamide block copolymers in layer 14 and PET in layer 12 exhibited an average delamination strength of about 1280 g/in. In comparison, a cast three-layer film having PMMA and PEN exhibited an average delamination strength of about 18 g/in.

In another sample, 3-layer cast webs were subsequently stretched in a biaxial stretcher (KARO IV, a commercially available instrument made by Bruckner of Siegsdorf, Germany). The stretching temperature was 130° C. for the PEN/PMMA cast web and 95° C. for PET/polydiorganosiloxane polyoxamide block copolymer cast web. The draw ratio was 3×3 and draw speed was 100-150%/sec for both systems. Delamination testing was carried out on these oriented films using a peel tester at 90 degree peel angle and 60 in/sec peel speed. An oriented (stretched) three-layer film 10 having polydiorganosiloxane polyoxamide block copolymers in layer 14 and PET in layer 12 exhibited an average delamination strength of about 100 g/in. In comparison, an oriented (stretched) three-layer film having PMMA and PEN exhibited an average delamination strength of about 30 g/in.

Although the applicants do not wish to be bound by any particular theory, one possible explanation is that while the size of an interphase is dominated by interaction parameters, adhesion measurements are a complicated combination of several types of forces. One contributor to the measured adhesion force is the chemical bond or interaction that occurs between molecules. Included would be covalent bonds, hydrogen bonding, and van der Waals forces, for example. In the case of rather inert, low index resins, one would expect this contribution to be small. A second contributor is physical: for example, entanglements—which relate to miscibility.

A third contributor to the adhesion force between the multilayers is the dissipation of energy during the peel or interfacial fracture. See U.S. Patent Pub. No. 2003-0072931-A1 entitled "Low Tg Multilayer Optical Films," which is hereby incorporated by reference. The more energy a system can dissipate during the failure, the higher the peel force. In the case of these low index resins, the viscoelastic nature of the polymers is important. The Tg of the polydiorganosiloxane segment of the polydiorganosiloxane polyamide block copolymers (−120° C.) is lower than that of other low index resins such as PMMA (110° C.). The very low Tg shifts the ductile/brittle transition to lower temperatures. Thus, the polydiorganosiloxane polyamide block copolymers are prone to viscoelastic deformation rather than brittle fracture upon external impact. This results in improved properties such as high tear, puncture, delamination, imprint and impact resistance.

Additionally, polydiorganosiloxane polyoxamide block copolymers go through a thermal transition at temperatures of concern in extrusion and heat set. Initially out of an extruder, the polydiorganosiloxane polyoxamide block copolymers demonstrate a high adhesion value with other polymers which drops somewhat when stretched at 90° C. It is possible that such stretching occurs at temperatures where the phase separated hard segments (amide-sections) are not mobile, inducing some strain. However, as shown in TABLE 2, heat setting at higher temperatures allows for annealing or dissipation of strain, again leading to higher delamination forces. Additionally, while the amide content is very low, there is some possible hydrogen bonding between the amide bonds and the end groups and potentially ester links of polymers such as PET;

this hydrogen bonding weakly contributes to higher adhesion force. The term "hydrogen bonding" refers to an electrostatic interaction of hydrogen of a highly polarized bond (e.g., O—H or N—H) and a lone pair of electrons of a small electronegative atom (e.g., fluorine, oxygen, or nitrogen) in a neighboring molecule or in another functional group. Optimization of these interactions occurs where temperature (mobility) allows these groups to associate with one another. In one example, the 3-layer PET-based oriented multilayer films 10 were heat set at elevated temperature for a period of time to improve the dimensional stability. The delamination results at different heat set temperatures and times for oriented PET and polydiorganosiloxane polyoxamide block copolymer multilayer films 10 are summarized in the following Table:

TABLE 2

Delamination of heat set film of PET and polydiorganosiloxane polyoxamide block copolymer

| Heat set temp | Heat set time | Delamination (g/in) |
|---|---|---|
| 95° C. | 10 sec | 193 |
| 95° C. | 30 sec | 235 |
| 95° C. | 60 sec | 183 |
| 105° C. | 10 sec | 176 |
| 105° C. | 30 sec | 155 |
| 105° C. | 60 sec | 300 |
| 115° C. | 10 sec | 303 |
| 115° C. | 30 sec | 399 |
| 115° C. | 60 sec | 320 |

When used as an optical film, multilayer film 10 is typically thin. Suitable films have varying thicknesses, but in exemplary embodiments, they have thicknesses of less than about 15 mils (about 380 micrometers), more typically less than about 10 mils (about 250 micrometers), and preferably less than about 7 mils (about 180 micrometers). Depending on the application, suitable multilayer films 10 may be as thin as about 0.5 mil (about 12.7 micrometers) or thinner or as thick as about 15 mils (about 381 micrometers) or thicker. An optical film also normally undergoes various bending and rolling steps during processing, and therefore, in exemplary embodiments of the present disclosure, multilayer film 10 is preferably flexible.

As discussed above, the ability to achieve the desired relationships among the various indices of refraction (and thus the optical properties of multilayer film 10) is influenced by the processing conditions used to prepare multilayer film 10. In the case of organic polymers which can be oriented by stretching, the films are generally prepared by co-extruding the individual polymers to form multilayer film 10 and then orienting film 10 by stretching at a selected temperature, optionally followed by heat-setting at a selected temperature. Alternatively, the extrusion and orientation steps may be performed simultaneously. In the case of polarizers, film 10 is stretched substantially in one direction (uniaxial orientation), while in the case of mirror films, film 10 is stretched substantially in two directions (biaxial orientation), which may be performed simultaneously or sequentially.

In different processing embodiments, multilayer film 10 may be allowed to dimensionally relax in a cross-stretch direction, resulting in a natural reduction in cross-stretch (equal to the square root of the stretch ratio); multilayer film 10 may be constrained to limit any substantial change in cross-stretch dimension; or multilayer film 10 may be actively stretched in a cross-stretch dimension. For example, multilayer film 10 may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film 10 having the desired refractive index relationship and physical dimensions. These variables are interdependent; thus, for example, a relatively low stretch rate could be used if coupled with, for example, a relatively low stretch temperature. In general, a stretch ratio in the range from about 1:2 to about 1:10 (more preferably about 1:3 to about 1:7) in the stretch direction and from about 1:0.2 to about 1:10 (more preferably from about 1:0.5 to about 1:7) orthogonal to the stretch direction is selected in an exemplary embodiment.

Figure 2:
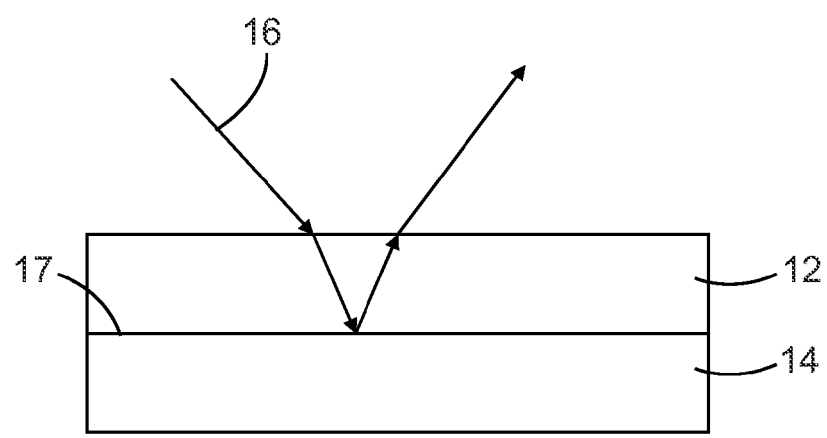
FIG. 2 shows an exemplary embodiment of a layer pair of multilayer film 10 of FIG. 1.

Applications of mirror films wherein the mirrors are required to reflect light at a variety of incidence angles can benefit from the use of birefringent materials in the mirror construction. See U.S. Pat. No. 5,882,774, incorporated herein by reference. For example, if the material of high refractive index layer 12 is a biaxially oriented polyester, the low index developed in the thickness direction (z direction) upon orientation of the polyester has been shown to eliminate the Brewster angle for p-polarized light, provided the thickness index ($n_z$) is equal to or lower than the thickness index of the material of the low refractive index layer 14. FIG. 2 shows an exemplary embodiment of a layer pair of multilayer film 10 of FIG. 1. In one example of the illustrated embodiment, high refractive index layer 12 is made of a birefringent material having a thickness index of about 1.49, such as polyesters polyethylene teraphthalate (PET) (in-plane indices of 1.65) or polyethylene naphthalate (PEN) (in-plane indices of 1.75). In this example, low refractive index layer 14 is made of an isotropic polydiorganosiloxane polyoxamide block copolymer having indices generally lower than 1.45, and in the preferred embodiment, having indices of about 1.41. In this example, the Brewster condition is not eliminated, although the decrease in reflectivity with angle of incidence is still much less than for a mirror constructed with all isotropic materials. For simplicity, the reflectivity of light ray 16 at a single interface surface 17 of the two layers 12, 14 is illustrated. The optical density of a multilayer film 10 stack will then scale proportionately to the number of layer pairs added to the stack. A single layer pair is illustrated in FIG. 2.

Figure 3:
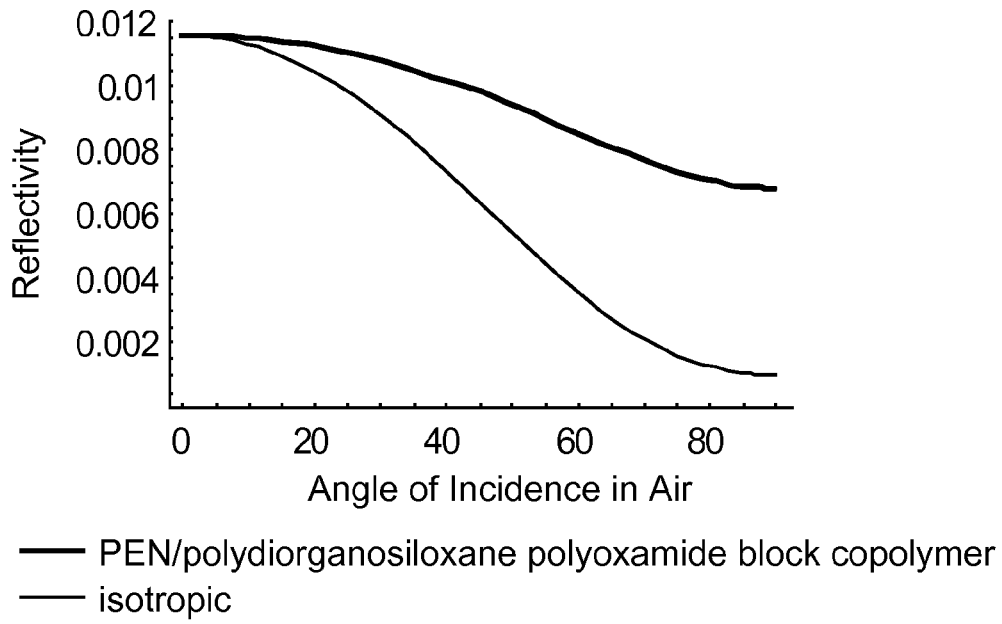
FIG. 3 shows the reflectivity of PEN/polydiorganosiloxane polyoxamide block copolymer films and entirely isotropic films for different light incidence angles.

FIG. 3 shows the reflectivity of PEN/polydiorganosiloxane polyoxamide block copolymer films and entirely isotropic films for different light incidence angles. The reflectivity of the PEN/polydiorganosiloxane polyoxamide block copolymer interface for p-polarized light is illustrated by the top curve in FIG. 3. The reflectivity of an interface of two isotropic materials having indices of 1.75 and 1.41 is shown with the bottom curve for comparison. The reflectivity of the entirely isotropic material interface drops much more rapidly with increasing incidence angle. The reflectivity of the PEN/polydiorganosiloxane polyoxamide block copolymer interface at 90 degrees drops to about 60% of its value at normal incidence.

Figure 4:
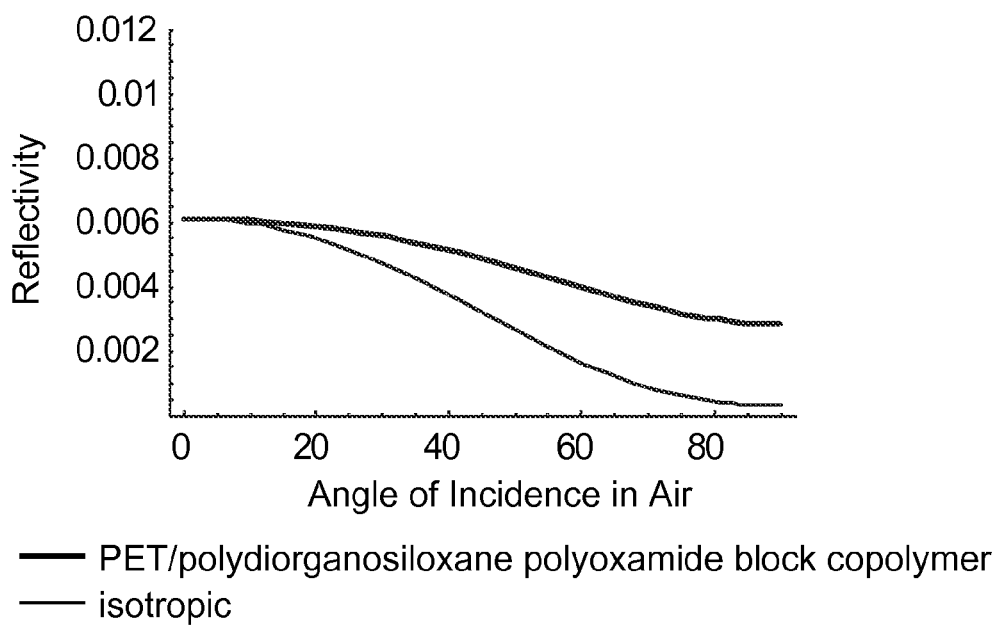
FIG. 4 shows the reflectivity of PET/polydiorganosiloxane polyoxamide block copolymer films and entirely isotropic films for different light incidence angles.

FIG. 4 shows the reflectivity of PET/polydiorganosiloxane polyoxamide block copolymer films and entirely isotropic films having indices of 1.65 and 1.49 for different light incidence angles. For PET/polydiorganosiloxane polyoxamide block copolymer films, the reflectivity at 90 degrees drops to about 50% of its value at normal incidence. When extrapolating to multilayer stack performance, these curves will scale directly with the number of layers added. The comparison must be made with optical density, i.e. −LOG(1−R), or −LOG (T). One can assume that T=1−R if the materials have low absorption values. Thus the −LOG(T) value at 90 degrees for a mirror made with PET and polydiorganosiloxane polyoxamide block copolymer will be 50% of its value at 0 degrees for p-polarized light. For example, if the mirror is 99% reflective at normal incidence, the reflectivity for p-polarized light will drop to 90% at grazing incidence. The total reflectivity (s and p-polarized light) will then be >95% at grazing incidence since the reflectivity for s-polarized light will be higher than 99%. Since the surface reflectivity at the air interface will also be very high at these angles, the actual measured reflectivity will be higher than this calculated internal reflectivity.

The high angle performance of these mirrors using multilayer films 10 can be improved by adding more layers that are tuned to reflect light at the high angles. The reflection spectrum of a multilayer dielectric mirror shifts to lower wavelengths as the incidence angle increases. Thus, in order to reflect, e.g. visible light, at all angles, such a mirror in one embodiment has layers that reflect near-infrared light at normal incidence. At high angles of incidence, the infrared portion of the spectrum shifts to cover portions of the visible light spectrum. Thus, in one embodiment, only the portion of the spectrum that covers the specified spectrum at high angles needs to be boosted with extra layers.

In another embodiment, mirrors including multilayer films 10 of the present disclosure can be combined with other multilayer mirrors that do not exhibit a Brewster's angle or have a relatively large Brewster's angle. The low angle portion of the spectrum can be reflected predominately by multilayer film 10 and portions can be reflected at high angles of incidence by mirrors that do not exhibit a Brewster's angle. Examples of such mirrors are PEN/PMMA and PET/coPMMA multilayer mirrors.

Figure 5:
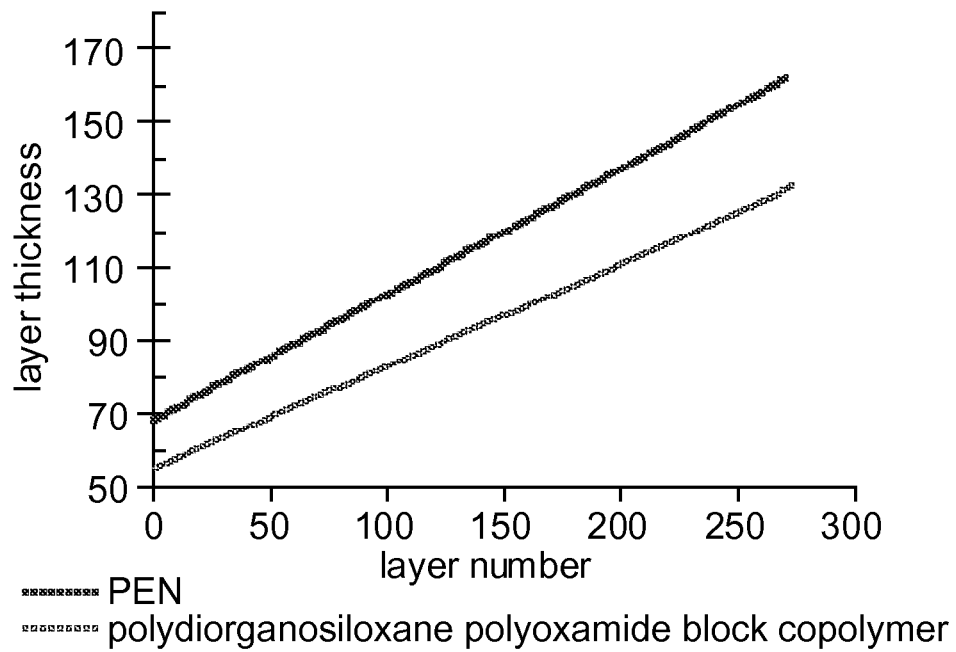
FIG. 5 shows a layer thickness profile of one exemplary embodiment of a multilayer film of FIG. 1, wherein the thicknesses are given in nanometers.

In one exemplary example of multilayer film 10, the reflectivity of a 275 layer stack of alternating layers of PEN in high refractive index layer 12 and polydiorganosiloxane polyoxamide block copolymer in low refractive index layer 14 was calculated using the 4×4 thin film optical modeling equations detailed in *Ellipsometry and Polarized Light*, by R. M. A. Azzam and N. M. Bashara, (Elsevier, Amsterdam, 1987). The PEN refractive index was assumed to be 1.74 at 633 nm and the polydiorganosiloxane polyoxamide block copolymer refractive index was assumed to be 1.41 at 633 nm. A layer thickness profile was generated so the mirror would reflect well in the visible spectrum at all angles. FIG. 5 shows a layer thickness profile, wherein the thicknesses are given in nanometers. The open symbols (lower line) represent the polydiorganosiloxane polyoxamide block copolymer layers. The upper line represents the PEN layers. All of the PEN and polydiorganosiloxane polyoxamide block copolymer layers were designed to be ¼ lambda with a linear gradient in thickness throughout the stack. As shown in FIG. 5, each individual layer 12, 14 of this example of multilayer film 10 has a different thickness in order to reflect light of different wavelengths. In one exemplary embodiment, multilayer film 10 reflects light with wavelengths in the range of about 400 nm to about 900 nm.

Figure 6:
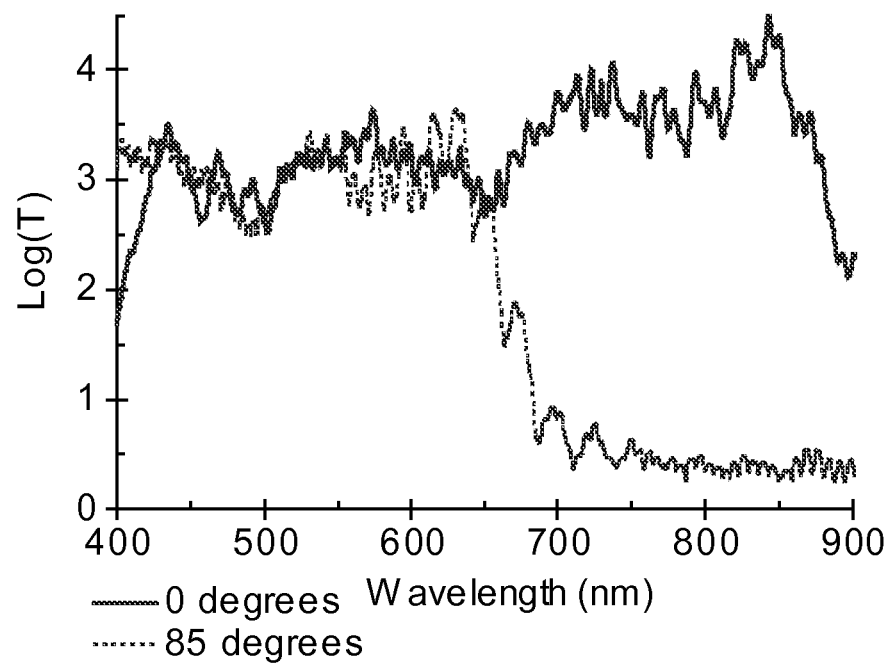
FIG. 6 shows the calculated optical density of the multilayer film embodiment of FIG. 5 for 0 and 85 degree angles of incidence and represents an averaged s and p-polarized light reflectivity.

FIG. 6 shows the calculated optical density of the multilayer film embodiment of FIG. 5 for 0 and 85 degree angles of incidence and represents an averaged s and p-polarized light reflectivity. Index dispersion was included in the stack calculation and helps boost the reflectivity in the blue. The normal incidence reflectance is very high in the infrared, but at 85 degrees this reflectivity has decreased somewhat due to the approaching Brewster angle. Reflectivity in the blue portion of the spectrum remains high due to the increasing index of refraction of PEN as one approaches its absorption edge at 380 nm. The average optical density of about 3.0 (about 99.9% R) for this multilayer stack design indicates that very high reflectivity mirrors can be made with this material combination, for light incident from any direction. In these calculations, the x and y refractive indices of the PEN were assumed to be equal and the x and y refractive indices of the polydiorganosiloxane polyoxamide block copolymer were assumed to be equal.

Suitable multilayer films 10 may also be prepared using techniques such as spin coating (e.g., as described in Boese et al., J. Polym. Sci.: Part B, 30:1321 (1992) for birefringent polyimides) and vacuum deposition (e.g., as described by Zang et. al., Appl. Phys. Letters, 59:823 (1991) for crystalline organic compounds); the latter technique is particularly useful for certain combinations of crystalline organic compounds and inorganic materials.

Figure 7:
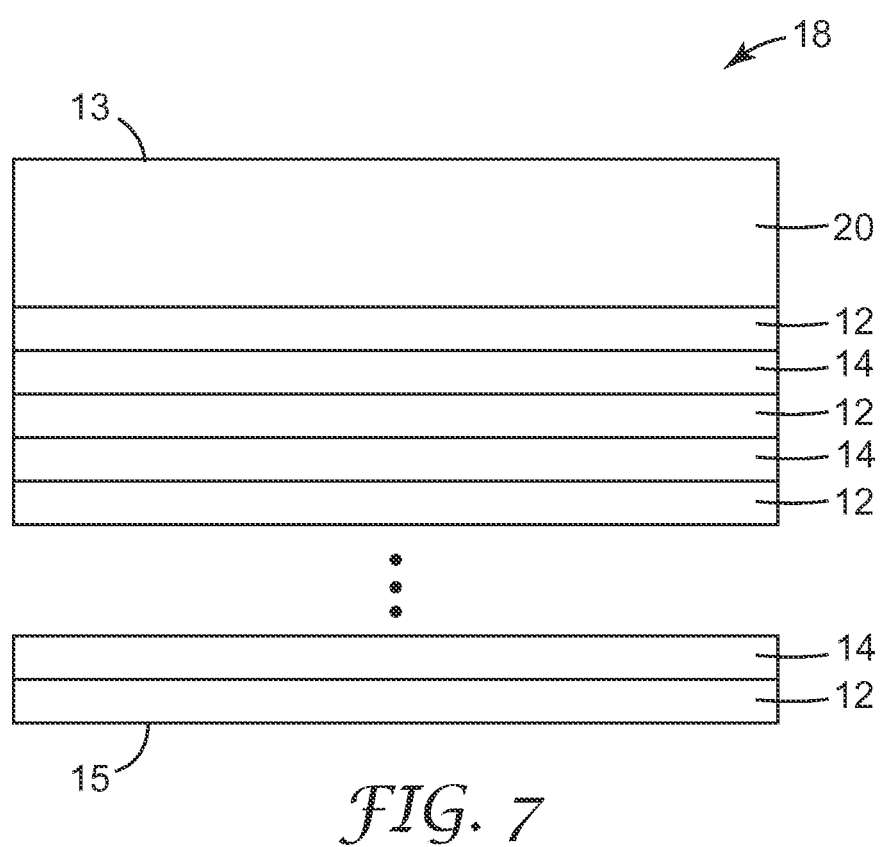
FIG. 7 shows a second exemplary embodiment of a multilayer optical film of the present disclosure including a skin layer.
Figure 8:
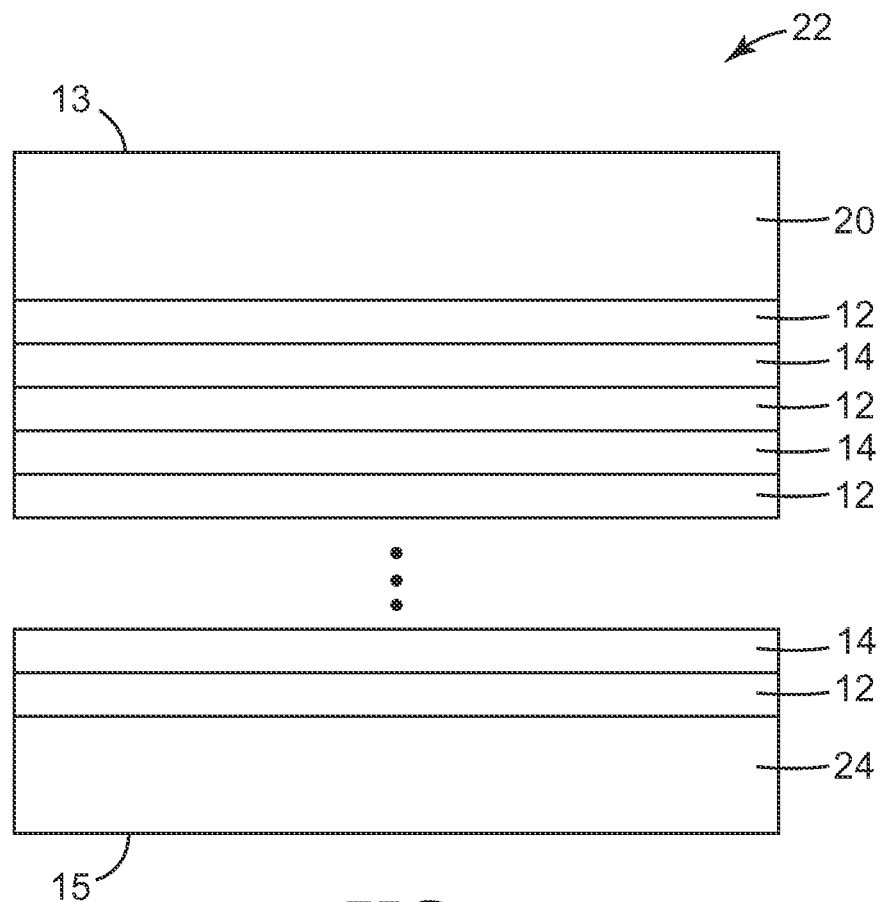
FIG. 8 shows a third exemplary embodiment of a multilayer optical film of the present disclosure including two skin layers.
Figure 9:
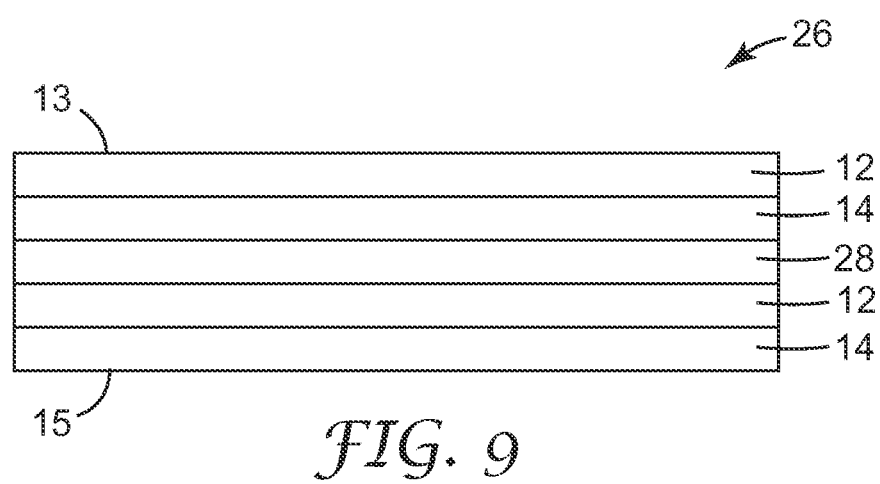
FIG. 9 shows a fourth exemplary embodiment of a multilayer optical film of the present disclosure including an internal layer of different material.
Figure 10:
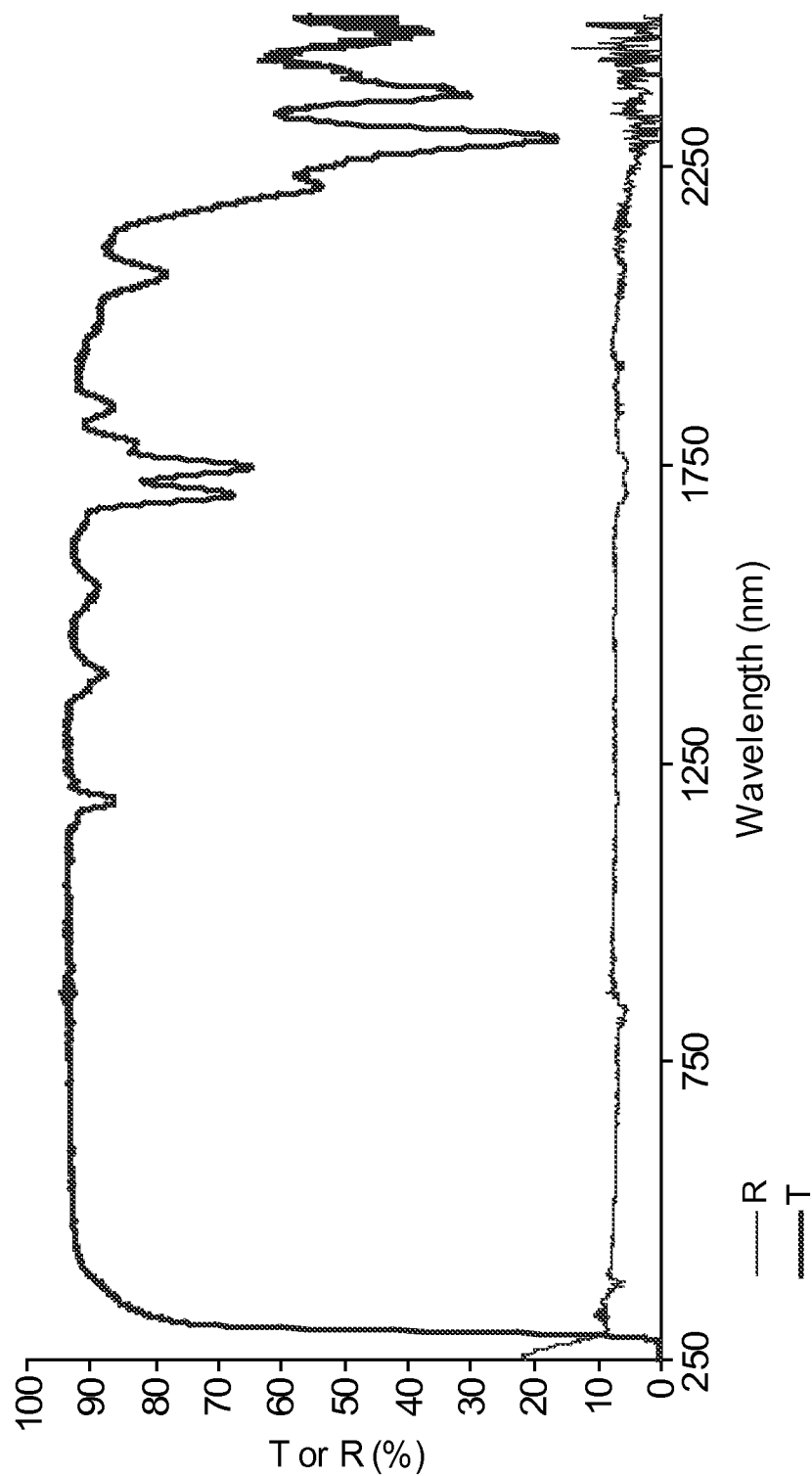
FIG. 10 shows the transmission (T) and reflection (R) spectra of a 0.5 mm thick film of polydiorganosiloxane polyoxamide block copolymer.
Figure 11:
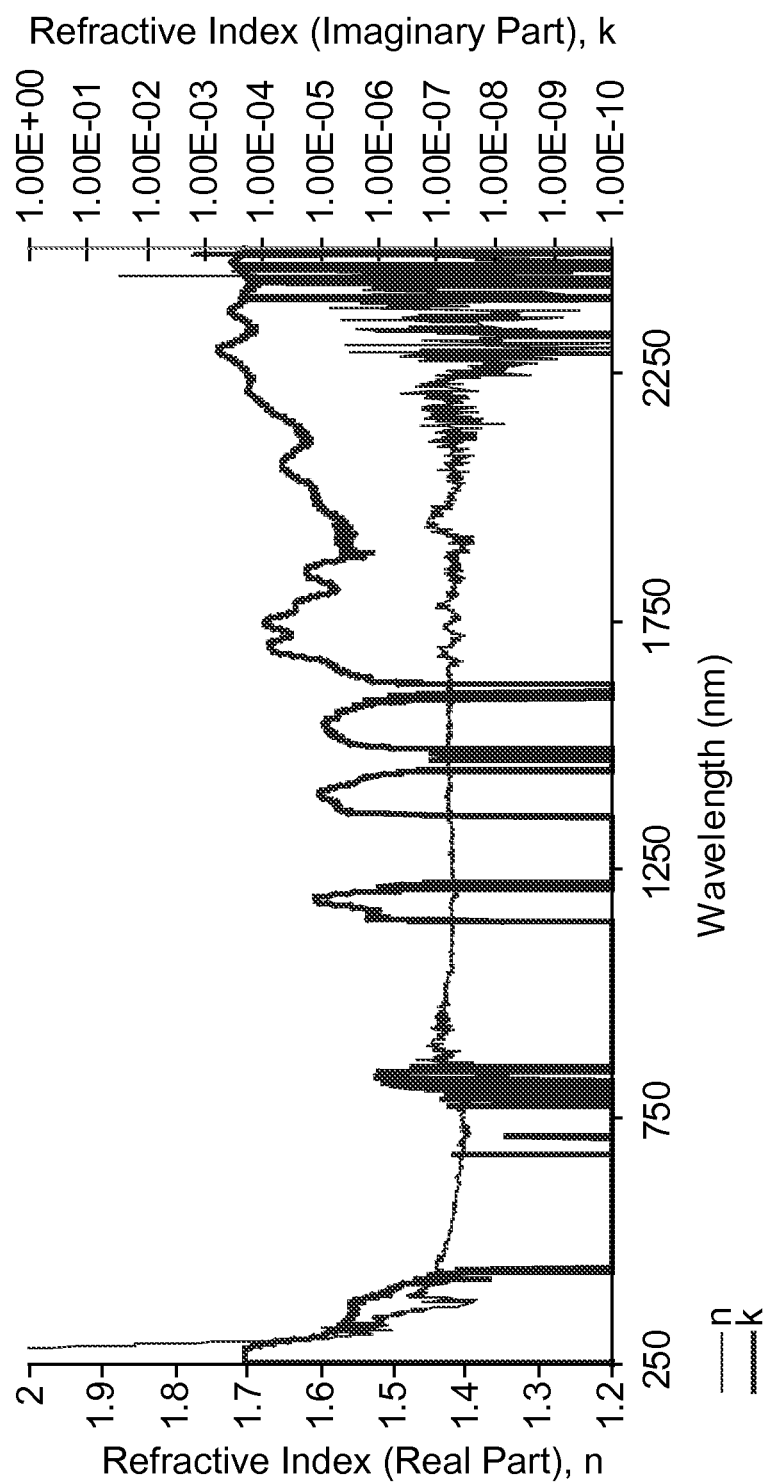
FIG. 11 shows the real (n) and imaginary (k) parts of the refractive index of the film of FIG. 10, calculated from the spectra of FIG. 10. As those of ordinary skill will readily appreciate, absorption is very low, resulting in a noisy measurement of the k values.
Figure 12:
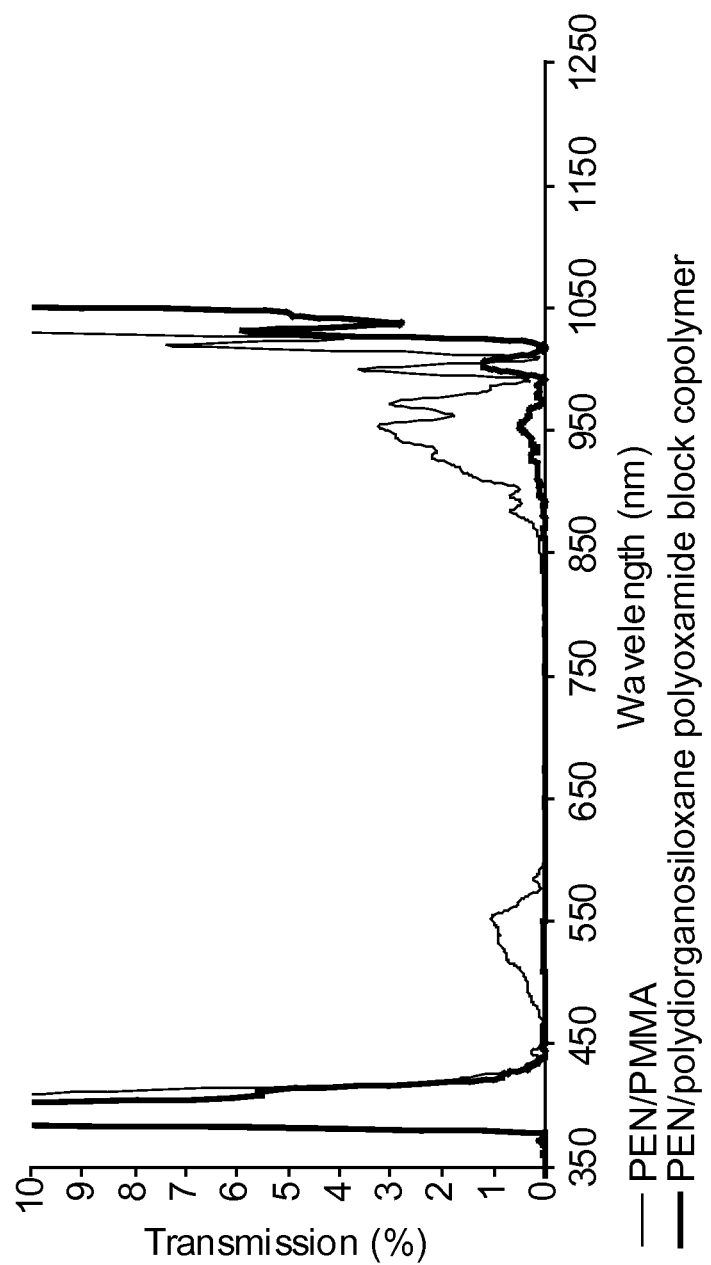
FIG. 12 shows the calculated transmission spectra for PEN/PMMA and PEN/polydiorganosiloxane polyoxamide block copolymer multilayer mirrors.
Figure 13:
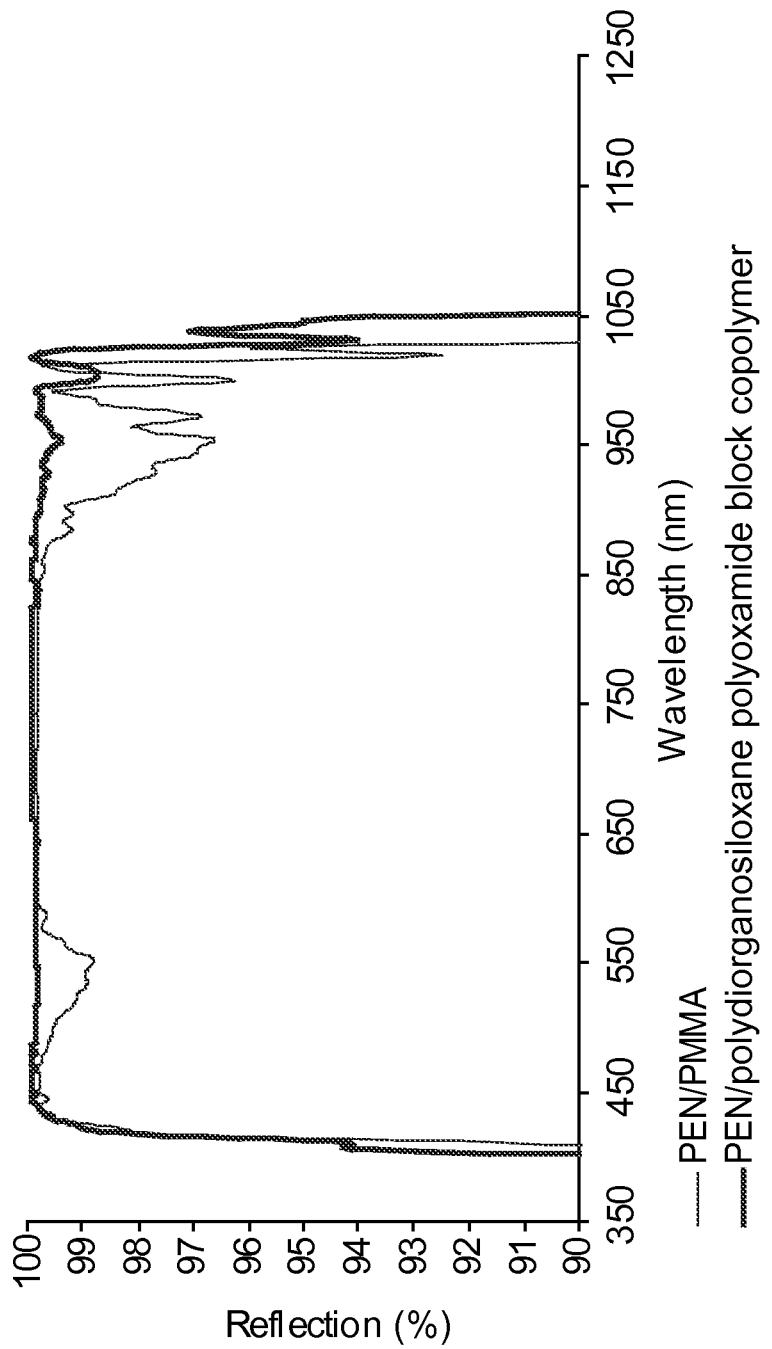
FIG. 13 shows the calculated reflection spectra for PEN/PMMA and PEN/polydiorganosiloxane polyoxamide block copolymer multilayer mirrors.

The appearance and/or performance of multilayer film 10 may be altered by including additional layers such as a skin layer on a major surface; an underskin layer contiguous with a skin layer; or an internal or protective boundary layer (PBL) within the stack of film layers. FIG. 7 shows multilayer film 18 having a single skin layer 20. Referring to FIG. 1, multilayer film 18 of FIG. 7 is similar to multilayer film 10 of FIG. 1 with the addition of a skin layer 20 on first major surface 13. FIG. 8 shows multilayer film 22 having two skin layers 20, 24. Referring to FIG. 1, multilayer film 22 of FIG. 8 is similar to multilayer film 10 of FIG. 1 with the addition of skin layers 20, 24 on first major surface 13 and second major surface 15, respectively. FIG. 9 shows multilayer film 26 having an internal layer 28. Referring to FIG. 1, multilayer film 26 of FIG. 9 is similar to multilayer film 10 of FIG. 1 with the addition of internal layer 28 within the stack of layers 12, 14.

Each layer 12, 14 is typically no more than about 1 µm thick and can have a thickness of about 400 nm or less. However, larger thicknesses may be used in some exemplary embodiments of the present disclosure. Each layer 12, 14 can have the same thickness. Alternatively, multilayer optical film 10 can include layers 12, 14 with different thicknesses to increase the reflective wavelength range. The thickness of each additional layers 20, 24, 28 is generally at least four times, typically at least 10 times, and can be at least 100 times the thickness of an individual layer 12, 14. However, smaller thicknesses may be used in some exemplary embodiments of the present disclosure. Such additional layers 20, 24, 28, however, should not unduly compromise the optical properties required for the application to which the multilayer film 18, 22, 26 is directed. The thickness of each layer of multilayer film 10, 18, 22, 26, as well as the number of layers, can be varied to make a multilayer film 10, 18, 22, 26 having a particular desired thickness and optical performance level.

Skin layers 20, 24 and interior layer 28 may be integrated at the time of film formation, either by coextrusion or in a separate coating or extrusion step, or they may be applied to the finished film at a later time, such as by coating or lamination of skin layer 20, 24 to a previously formed film. Total additional layer 20, 24, 28 thicknesses typically range from about 2% to about 50% of the total thickness of multilayer film 18, 22, 26.

Examples of additional layers or coatings are described in U.S. Pats. No. 6,368,699, and 6,459,514 both entitled "Multilayer Polymer Film with Additional Coatings or Layers," both of which are incorporated herein by reference, and U.S. Pat. No. 6,783,349 to Neavin et al., entitled "Apparatus for Making Multilayer Optical Films," incorporated herein by reference. A non-limiting listing of coatings or layers that may be combined with multilayer film 10 is described in more detail in the following examples.

The composition of additional layers 20, 24, 28 may be chosen, for example, to protect the integrity of layers 12, 14 during or after processing, to add mechanical or physical properties to multilayer film 10; or to add optical functionality to multilayer film 10. Functional components such as antistatic additives, ultraviolet light absorbers (UVAs), hindered amine light stabilizers (HALS), dyes, colorants, pigments, antioxidants, slip agents, low adhesion materials, conductive materials, abrasion resistant materials, optical elements, dimensional stabilizers, adhesives, tackifiers, flame retardants, phosphorescent materials, fluorescent materials, nanoparticles, anti-graffiti agents, dew-resistant agents, load bearing agents, silicate resins, light diffusing materials, light absorptive materials and optical brighteners may be included in these layers, preferably such that they do not substantially interfere with the desired optical or other properties of the resulting product. In some exemplary embodiments, one or more additional layers 20, 24, 28 may be or may include diffusers, such as a rough, matte or structured surface, a beaded diffuser or a diffuser including organic and/or inorganic particles, or any number or combination thereof. The functional components listed above may also be incorporated into the polydiorganosiloxane polyamide block copolymer layer or layers 12, 14 provided such incorporation does not adversely affect any of the optical requirements for the layer (s) to an undesirable extent.

In one example, skin layers 20, 24 are used to aid in post-extrusion processing; for example, by preventing sticking of the film to hot rollers or tenter clips. In another embodiment, skin layers 20, 24 are added to impart desired barrier properties to multilayer film 18, 22. For example, barrier films or coatings may be added as skin layers 20, 24 or as a component in skin layers 20, 24 to alter the transmissive properties of the multilayer film 18, 22 towards liquids, such as water or organic solvents, or gases, such as oxygen or carbon dioxide.

Skin layers 20, 24 may also be added to impart or improve abrasion resistance in the resulting multilayer film 18, 22. For example, a skin layer 20, 24 comprising particles of silica embedded in a polymer matrix may be used. In another embodiment, skin layers 20, 24 may comprise an abrasion resistant coating. Examples of abrasion-resistant or hard coatings include acrylic hardcoats such as Acryloid A-11 and Paraloid K-120N, available from Rohm & Haas; urethane acrylates, such as described in U.S. Pat. No. 4,249,011, hereby incorporated by reference, and those available from Sartomer Corp.; and urethane hardcoats such as those obtained from reacting an aliphatic polyisocyanate such as Desmodur N-3300, available from Miles, Inc. with a polyester such as Tone Polyol 0305, available from Union Carbide.

Skin layers 20, 24 may also be added to impart or improve puncture and/or tear resistance in the resulting multilayer film 18, 22. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin and optical layers, viscoelastic response, relaxation and crystallization behavior under draw conditions, thermal stability at use temperatures, weatherability, ability to adhere to coatings and permeability to various gases and solvents. Puncture or tear resistant skin layers may be applied during the manufacturing process or later coated onto or laminated to multilayer film 10. Adhering these layers to multilayer film 10 during the manufacturing process, such as by a coextrusion process, provides the advantage that multilayer film 10 is protected during the manufacturing process.

In one example, additional layer 20, 24, 28 includes a dye or pigment that absorbs in one or more selected regions of the spectrum. Exemplary selected regions of the spectrum may include portions or all of the visible spectrum as well as ultraviolet and infrared. If all of the visible spectrum is absorbed, the layer will appear opaque. Materials for layers 20, 24, 28 can be selected in order to change the apparent color of light transmitted or reflected by multilayer film 18, 22, 26. They can also be used to compliment the properties of the film, particularly where the film transmits some frequencies while reflecting others. In another embodiment, the use of a UV absorptive material in a skin cover layer 20, 24 is particularly desirable because it may be used to protect inner layers 12, 14, 28 that may sometimes be unstable when exposed to UV radiation. In one embodiment, a fluorescent material is incorporated into layer 20, 24, 28. Fluorescent materials absorb electromagnetic energy in the ultraviolet region of the spectrum and reemit in the visible.

Adhesives, including pressure sensitive adhesives, form another desirable class of materials that may be applied to a multilayer stack as a skin layer 20, 24. Generally, pressure sensitive adhesives are applied when multilayer film 18, 22 is intended for later lamination to another material, such as a glass or metal substrate. Additionally, the polydiorganosiloxane polyamides of layer 14 can be formulated into adhesive compositions such as pressure sensitive adhesives and heat activated adhesives that contain a tackifier. Such adhesive compositions comprising polydiorganosiloxane polyoxamides are further described in U.S. patent application Ser. No. 11/317,602, filed on Dec. 23, 2005, incorporated herein by reference in its entirety.

Another material that may be incorporated in skin layer 20, 24 is a slip agent. A slip agent will make multilayer film 18, 22 easier to handle during the manufacturing process. Typically a slip agent is used with a mirror film rather than a film intended to transmit a portion of the light striking it. The side including the slip agent is typically the side intended to be laminated to a supporting substrate in order to prevent the slip agent from increasing haze associated with the reflection.

Many of the advantages derived from skin layers 20, 24 can also be derived from an analogous internal layer 28 of multilayer film 26, such as that shown in FIG. 9. Thus, the foregoing discussion regarding skin layers 20, 24 is also applicable to internal layer 28. Moreover, while one internal layer 28 is illustrated, it is contemplated that numerous internal layers 28 may be used in a multilayer film 26 in accordance with the present disclosure.

Other additional layers 20, 24, 28 include layers containing holographic images, holographic diffusers, or other diffusing layers. The foregoing has described examples of various layers that can be applied to a multilayer film stack to alter its properties. In general, any additional layers may be added, typically offering different mechanical, chemical, or optical properties than those of the layers 12, 14. Additionally, the polydiorganosiloxane polyamide block copolymer material itself may be used in a skin layer or other layer on multilayer film 10 as well as on other films. These applications are further described in U.S. patent application Ser. No. 60/753, 857, filed on Dec. 23, 2005, and a copending application with Attorney Docket No. 61495US003 filed on the same day as the present application, incorporated herein by reference in their entirety.

Moreover, layers of differing materials may be distributed within the stack, as well as on one or two of the major surfaces.

In the exemplary embodiment shown in FIG. 7, the additional layer 20 may be an absorbing or dichroic polarizer layer, as described, for example, in U.S. Pat. No. 6,096,375 to Ouderkirk et al., entitled "Optical Polarizer," incorporated herein by reference. In some such configurations, the transmission axis of a dichroic polarizer is aligned with the transmission axis of a reflective polarizer.

Test Methods

Hardness Testing

Shore A Hardness was measured according to ASTM D2240-5 Standard Test Method for Rubber Property-Durometer Hardness. This test method is based on the penetration of a specific type of indentor when forced into the material under specified conditions. The indentation hardness is inversely related to the penetration and is dependent on the elastic modulus and viscoelastic behavior of the material.

Titration Method to Determine Equivalent Weight

Approximately 10 grams (precisely weighed) of the precursor compound of Formula II was added to a jar. Approximately 50 grams THF solvent (not precisely weighed) was added. The contents were mixed using a magnetic stir bar mix until the mixture was homogeneous. The theoretical equivalent weight of precursor was calculated and then an amount of N-hexylamine (precisely weighed) in the range of 3 to 4 times this number of equivalents was added. The reaction mixture was stirred for a minimum of 4 hours. Bromophenol blue (10-20 drops) was added and the contents were mixed until homogeneous. The mixture was titrated to a yellow endpoint with 1.0N (or 0.1N) hydrochloric acid. The number of equivalents of precursor was equal to the number of equivalents of N-hexylamine added to the sample minus the number of equivalents of hydrochloric acid added during titration. The equivalent weight (grams/equivalent) was equal to the sample weight of the precursor divided by the number of equivalents of the precursor.

Inherent Viscosity (IV) for Polydiorganosiloxane Polyoxamide Block Copolymer

Average inherent viscosities (IV) were measured at 30° C. using a Canon-Fenske viscometer (Model No. 50 P296) in a tetrahydrofuran (THF) solution at 30° C. at a concentration of 0.2 g/dL. Inherent viscosities of the materials of the invention were found to be essentially independent of concentration in the range of 0.1 to 0.4 g/dL. The average inherent viscosities were averaged over 3 or more runs. Any variations for determining average inherent viscosities are set forth in specific Examples.

An exemplary multilayer film 10 is described in the following examples:

EXAMPLE 1

A polydiorganosiloxane polyoxamide block copolymer, silicone polyamide polymer, was prepared as follows: 10.00 grams of 5 k silicone diamine (a polydimethylsiloxane diamine with MW=5200; 1.0 eq; 0.0019 mole diamine that was prepared as described in U.S. Pat. No. 5,214,119, incorporated by reference) was degassed in a round bottomed flask with a heat gun and aspirator. 44.8 grams of tetrahydrofuran (THF) was then added. Next, 0.9773 grams of trifluoroethyl oxalate (MW=254.09; 2.0 eq; 0.0038 mole) was dripped into the mixture under ambient conditions. 0.2235 g of distilled hexamethylene diamine (MW=116.21; 1.0 eq; 0.0019 mole) was diluted in 1 ml of THF; this mixture was added to the flask at a rather fast steady drip with a pipette. The mixture was stirred under ambient conditions for several minutes. The reaction was then sampled and verified that the reaction had progressed to a high level of polymerization. A sample was cast out and upon drying produced a clear, strong elastomeric film.

A portion of this sample was dissolved in a solvent blend of 50 wt % methyl ethyl ketone and 50 wt % isopropanol at a level of 50 wt % solids.

A PET/silicone polyamide/PET film was constructed as follows:

1) Two 4"×4" pieces of 30 mil cast web PET film were cut to size.

2) Next, a paintbrush was utilized to apply the 50% solids methyl ethyl ketone/isopropanol blend solution of silicone polyamide polymer to one side of each of the cast web PET films. These coated films were allowed to air dry.

3) The coated sides of the cast web films were placed in contact with each other and placed in a 5000 psi press at 200° F. (93° C.) for 30 seconds.

4) This pressed sample was then clamped into an 85° C. laboratory biaxial film stretcher. The film was then heated for 30 seconds at 95° C. and stretched at 20%/sec to a balanced biaxial 3:1 stretch ratio.

Upon removal from the stretcher, the sample visually exhibited excellent spreading (continuous layer of uniform thickness) of the silicone polyamide between the PET film layers. Additionally, the silicone polyamide/PET interfaces proved to have significant adhesive strength.

EXAMPLE 2

Diethyl oxalate (241.10 grams) was placed in a 3 liter, 3-neck resin flask equipped with a mechanical stirrer, heating mantle, nitrogen inlet tube (with stopcock), and an outlet tube. The flask was purged with nitrogen for 15 minutes and 5 k PDMS diamine (a polydimethylsiloxane diamine with an average molecular weight of about 5,000 g/mole that was prepared as described in U.S. Pat. No. 5,214,119, incorporated by reference) (2,028.40 grams, MW=4,918) was added slowly with stirring. After 8 hours at room temperature, the reaction flask was fitted with a distillation adaptor and receiver, the contents stirred and heated to 150° C. under vacuum (1 Torr) for 4 hours, until no further distillate was able to be collected. The remaining liquid was cooled to room temperature to provide 2,573 grams of oxamido ester terminated product. Gas chromatographic analysis of the clear, mobile liquid showed that no detectable level of diethyl oxalate remained. Molecular weight was determined by $^1$H NMR (MW=5,477 grams/mole) and titration (Equivalent weights of 2,573 grams/mole and 2,578 grams/mole).

793.20 g of 5 k ethyl oxalylamidopropyl terminated polydimethyl siloxane prepared as described above (793.20 g, titrated MW=5183) was placed into a 3 liter, 3-neck resin flask equipped with a mechanical stirrer, heating mantle, nitrogen inlet tube (with stopcock), and an outlet tube. The flask was purged with nitrogen for 15 minutes and hexane diamine (17.48 grams) was added. The mixture was mechanically stirred and heated to 150° C. under a nitrogen atmosphere for 3.5 hours. The viscous molten product was poured into a glass tray and allowed to cool to provide the silicone polyoxamide product as a clear, strong elastomeric slab having a Shore A hardness of 59. This slab of polydiorganosiloxane polyoxamide block copolymer resin was then ground into fine pellets.

This polydiorganosiloxane polyoxamide block copolymer resin was then incorporated into a 3-layer film through a process of co-extrusion. This extrusion was carried out as follows: A 1.5" Davis-Standard single-screw extruder utilized dried standard PET resin (0.60 IV) known as DMT clear (available from 3M Company) to feed the bottom (chill roll side) layer of a three layer die/feedblock. A 25 mm Berstorff twin-screw extruded was used to feed the middle layer of the die and polydiorganosiloxane polyoxamide block copolymer resin was fed into this extruder. A 1" Davis-Standard single-screw extruder utilized dried standard PET resin (0.60 IV) known as DMT clear (available from 3M Company) to feed the top layer of a three layer die. An extrusion processing temperature of about 530° F. (277° C.) was chosen for PET and polydiorganosiloxane polyoxamide block copolymer materials. A 6 inch (15.2 cm) wide extrudate was quenched on a chill roll and 30 mil (0.76 mm) cast web was collected. As noted earlier in this document, excellent film formation and interlayer adhesion was achieved.

EXAMPLE 3

Into a 20° C. 2 gallon stainless steel reaction vessel, 3675.4 grams of 5 k ethyl oxalylamidopropyl terminated polydimethyl siloxane (titrated MW=6174), which was prepared in a fashion similar to the description in the previous example, was placed. The vessel was subjected to agitation (80 rpm), and purged with nitrogen flow and vacuum for 15 minutes. The kettle was then nitrogen pressurized to 5 psig and heated to 90° C. over the course of 25 minutes. 81.08 grams of meta-Xylylene Diamine (available from TCI America) was then added to the kettle, followed by 80 grams of toluene. The kettle was then heated to a temperature of 105° C. After 65 minutes at 105° C., pressure on the kettle was slowly vented over the course of 5 minutes. The kettle was then subjected to vacuum (~20 mmHg) for one hour to remove the ethanol and toluene. The kettle was then repressured to 2 psig and the viscous molten polymer was then drained into a Teflon coated tray and allowed to cool. The cooled silicone polyoxamide product, polydiorganosiloxane polyoxamide block copolymer, was then ground into fine pellets. The IV of this material was determined to be 0.853 dL/g (in THF).

This polydiorganosiloxane polyoxamide block copolymer resin was then incorporated into a 61-layer film through the process of co-extrusion. This extrusion was carried out as follows:

Into a 1.5" Davis-Standard single-screw extruder with neck tube, Invista 8602 PET resin (available from Invista of Charlotte, N.C.) was fed. This extrusion train supplied material to the 31 alternating 'A' layers of a 61 layer feedblock and die. Into a 25 mm Berstorff twin-screw extruded with an associated necktube and gear pump, the above described silicone polyoxamide polydiorganosiloxane polyoxamide block copolymer material was fed. This extrusion train supplied material to the 30 alternating 'B' layers of the 61 layer feedblock and die.

A melt processing temperature of about 540° F. (282° C.) was utilized for the PET extrusion train, while the polydiorganosiloxane polyoxamide block copolymer extrusion line was heated to a temperature of 450° F. (232° C.). The 61 layer feedblock and die were heated to a temperature of 530° F. (277° C.).

A 6 inch (15.2 cm) wide extrudate was quenched on a chill roll and 22 mil cast web was collected. Excellent film formation and interlayer adhesion were achieved. Optical micrographs of the cast web sample were taken to verify distinct layer formation.

A portion of the cast web sample was cut into a 4"×4" square and then clamped into an 85° C. laboratory biaxial film stretcher. The film was heated for 30 seconds at 95° C. and stretched at 20%/sec to a balanced biaxial 3:1 stretch ratio.

EXAMPLE 4

Into a 20° C. 10 gallon stainless steel reaction vessel, 18158.4 grams of 14 k ethyl oxalylamidopropyl terminated polydimethyl siloxane (titrated MW=14,890), which was prepared in a fashion similar to the description in the previous example, was placed. The vessel was subjected to agitation (75 rpm), and purged with nitrogen flow and vacuum for 15 minutes. The kettle was then heated to 80° C. over the course of 25 minutes. 73.29 grams of ethylene diamine (GFS Chemicals) were vacuum charged into the kettle, followed by 73.29 grams of toluene (also vacuum charged). The kettle was then pressurized to 1 psig and heated to a temperature of 120° C. After 30 minutes, the kettle was heated to 150° C. Once a temperature of 150° C. was reached, the kettle was vented over the course of 5 minutes. The kettle was subjected to vacuum (~65 mmHg) for 40 minutes to remove the ethanol and toluene. The kettle was then pressured to 2 psig and the viscous molten polymer was then drained into Teflon coated trays and allowed to cool. The cooled silicone polyoxamide product, polydiorganosiloxane polyoxamide block copolymer, was then ground into fine pellets. The IV of this material was determined to be 0.829 dL/g (in THF).

This polydiorganosiloxane polyoxamide block copolymer resin was then incorporated into a 61-layer film through the process of co-extrusion. This extrusion was carried out as follows:

Into a 1.5" Davis-Standard single-screw extruder and neck tube, Invista 8602 PET resin (available from Invista of Charlotte, N.C.) was fed. This extrusion train supplied material to the 31 alternating 'A' layers of a 61 layer feedblock and die. Into a 25 mm Berstorff twin-screw extruded with an associated neck tube and gear pump, the above described silicone polyoxamide polydiorganosiloxane polyoxamide block copolymer material was fed. This extrusion train supplied material to the 30 alternating 'B' layers of the 61 layer feedblock and die.

A melt processing temperature of about 540° F. (282° C.) was utilized for the PET extrusion train, the polydiorganosiloxane polyoxamide block copolymer extrusion train, and the 61 layer feedblock and die.

A 6 inch (15.2 cm) wide extrudate was quenched on a chill roll and 22 mil cast web was collected. Excellent film formation and interlayer adhesion was achieved. Optical micrographs of the cast web sample were taken to verify distinct layer formation.

A portion of the cast web sample was cut into a 4"×4" square and then clamped into an 85° C. laboratory biaxial film stretcher. The film was heated for 30 seconds at 95° C. and stretched at 20%/sec to a balanced biaxial 3:1 stretch ratio.

EXAMPLE 5

To a solution of 152.2 parts of methyl salicylate and 101.2 parts triethylamine in toluene (30%) was added dropwise with stirring a 40% solution of 91.5 parts of adipoyl chloride in toluene. An immediate precipitate of triethylamine hydrochloride formed. Stirring was continued for 1 hour after addition was complete. The mixture was filtered, and the filtrate was evaporated to dryness in a rotary evaporator to provide a white crystalline solid. The product, the di-methyl salicylate of adipic acid, was isolated by slurrying in hexane and filtering and dried in an oven. The product was pure by TLC and NMR spectrum.

A 30% by weight solution of 526.0 parts of a 5260 MW polydimethylsiloxane diamine (prepared as described in U.S. Pat. No. 5,214,119, incorporated herein by reference) and 11.6 parts of hexamethylene diamine in isopropyl alcohol was prepared. A 30% by weight solution in isopropyl alcohol of 82.9 parts of the methyl salicylate adipate ester (prepared as above) was prepared and this solution was added suddenly to the first solution. The clear solution was stirred at room temperature overnight during which time the viscosity of the solution rose significantly. The solution was cast into a glass tray, the solvent allowed to evaporate over several hours, and dried completely in an oven at 70 degrees C. overnight to provide a clear, strong elastomeric film, silicone polyadipamide.

The silicone polyadipamide was dissolved in a 50 wt % methyl ethyl ketone/50 wt % isopropanol blend at 10 wt % solids. This solution was coated out onto an unprimed oriented polyester film (Scotchpar 2 mil PET film available from 3M company) using a #12 Meyer rod, leaving an uncoated margin all around the coated area. The sample was allowed to dry. Coating appearance of the dried silicone polyadipamide was excellent. The polymer coating could not be removed from the film. The coated PET film was then folded over onto itself, with the coated side comprising the inside of the folded film. This specimen was placed in a 210° C. press at 2000 PSI for 30 seconds. Upon removal from the press, the specimen was grasped by hand by the uncoated margins of the PET substrate film, and pulled apart. Failure occurred cohesively within the silicone polyadipamide layer and the silicone polyadipamide layer was not removed from either of the PET surfaces.

Although the present disclosure has been described with reference to preferred embodiments, those of skill in the art will recognize that changes may be made in form and detail without departing from the spirit and scope of the present disclosure.

The invention claimed is:

1. A multilayer film comprising alternating layers of a first polymeric material and a second polymeric material, wherein the first polymeric material comprises a first index of refraction and the second polymeric material comprises a second index of refraction less than the first index of refraction, wherein the second polymeric material further comprises a polydiorganosiloxane polyoxamide block copolymer; wherein the multilayer film is a polarizer or a mirror.

2. The multilayer film of claim 1, wherein a difference between the first index of refraction and the second index of refraction is greater than about 0.05.

3. The film of claim 1, wherein the first material is birefringent.

4. The film of claim 1 wherein the first polymeric material is selected from the group consisting of polyalkylene naphthalates, isomers of polyalkylene naphthalates, and copolymers of polyalkylene naphthalates.

5. The film of claim 1 wherein the first polymeric material is selected from the group consisting of polyalkylene terephthalates and copolymers of polyalkylene terephthalates.

6. The film of claim 1 further comprising a third layer contiguous with either the first layer or the second layer, the third layer comprising a third material.

* * * * *